United States Patent [19]

Frobenius

[11] 3,805,126

[45] Apr. 16, 1974

[54] CHARGE STORAGE TARGET AND METHOD OF MANUFACTURE HAVING A PLURALITY OF ISOLATED CHARGE STORAGE SITES

[75] Inventor: Wolf D. Frobenius, Murrysville, Pa.

[73] Assignee: Westinghouse Electric Corporation, Pittsburgh, Pa.

[22] Filed: Oct. 11, 1972

[21] Appl. No.: 296,719

[52] U.S. Cl. ....... 317/235 R, 313/65 T, 313/68 AB, 317/235 N, 317/235 NA

[51] Int. Cl. ........................................... H01j 15/00

[58] Field of Search ......... 313/68, 65 T, 68 AB, 66; 317/235, 235 NA

[56] References Cited

UNITED STATES PATENTS

| | | | |
|---|---|---|---|
| 3,707,657 | 12/1972 | Veith | 317/235 |
| 3,517,246 | 6/1970 | Chester et al. | 313/66 |
| 3,564,309 | 2/1971 | Hoeberechts | 313/66 |
| 3,581,151 | 5/1971 | Boyle et al. | 313/66 |
| 3,697,832 | 10/1972 | Hannaoka | 317/235 |
| 3,676,741 | 7/1972 | Forst et al. | 317/235 |
| 3,569,758 | 3/1971 | Horiuchi | 313/66 |
| 3,663,820 | 5/1972 | Burns | 317/235 |

*Primary Examiner*—James W. Lawrence
*Assistant Examiner*—Saxfield Chatmon, Jr.
*Attorney, Agent, or Firm*—W. G. Sutcliff

[57] ABSTRACT

A charge storage device and method of manufacture of the type in which a target electrode provides a plurality of spatially disturbed isolated charge storage sites of semiconductor material provided within the interstices of an electrical conductive mesh with insulating barrier means provided between the semiconductor storage sites and the conductive mesh. Input excitation is directed onto the input side of the target and may be in the form of electrons or light capable of generating electron-hole pairs within the semiconductor material which diffuse through to the storage sites. The storage sites which are located on the output side of the target are provided with sensing and converting means such as an electron beam for converting the charge into an electrical signal. The process of manufacture of the device includes providing a semiconductor wafer with a substrate and pillars extending from one surface of said substrate, forming a junction within the upper portion of the pillar, providing an insulating coating on the pillars and surrounding intervening surfaces between the pillars, electroplating an electrical conductive support mesh within the moat region surrounding the pillars and etching away the substrate of the wafer so that only the pillar members remain supported within the metallic support mesh framework. The conductive mesh with the insulating coating provides a barrier about each semiconductor storage site and permits passage of minority carriers generated near the input side of the target within the semiconductor member to the storage sites without diffusion to adjacent storage sites. In this manner, the target images intense spots of input radiation in a scene without significant spreading or blooming of the high intensity spots caused by lateral diffusion of the minority carriers through adjacent storage sites.

4 Claims, 21 Drawing Figures

CLEAN

OXIDATION

PHOTO RESIST
OXIDE ETCH

DEEP ETGH

OXIDE ETCH

OXIDATION

PHOTORESIST

OXIDE ETCH

DIFFUSE

TI/AU EVAPORATION

PHOTO RESIST

TI/AU ETCHING AND PHOTORESIST REMOVAL

AU MEMBRANE PLATING

TI/AU EVAPORATION

PHOTORSIST

AU CONTACT PLATING

SILICON ETCHING
PHOTORESIST REMOVAL
SHORT GOLD ETCHING

CHARGE STORAGE TARGET AND METHOD OF MANUFACTURE HAVING A PLURALITY OF ISOLATED CHARGE STORAGE SITES

BACKGROUND OF THE INVENTION

There are many types of charge storage devices in the art. These charge storage devices may be of the type in which input radiation in the form of light from a scene is directed directly onto a charge storage target to generate a charge image, and is read out by means of an electron beam. An example of such a device is a conventional vidicon camera tube. Other types of camera tubes, such as secondary electron conductions (SEC) pickup tube, convert the input light radiations into an electron image which is directed onto the charge storage target. Here again, the charge image generated in the change target is read out by means of an electron beam. Another type of pickup tube is comprised of a semiconductor wafer with a mosaic of regions of opposite type conductivity to the wafer provided on one surface of the water which is scanned by a reading electron beam. The regions are separated from each other and each forms a rectifying junction within the semiconductor wafer or substrate. Radiations in the form of electrons or light are directed into the substrate from the input or opposite side of the target with respect to the reading electron beam to generate electron-hole pairs. The junctions are provided with a reverse bias and the minority carriers discharge this reverse bias. This device is more thoroughly described in U.S. Pat. No. 3,011,089 issued to F. W. Reynolds on Nov. 28, 1961 and U.S. Pat. No. 3,403,284 by T. M. Buck et al. issued Sept. 24, 1968. These latter devices are generally referred to as a silicon diode array target. The diode array is comprised of an array of spatially disposed diodes formed in a single slice of a semiconductor material such as silicon. In operation, an image of a scene being viewed is focused on the input side of the wafer. The opposite surface of the wafer, the readout surface, is provided with an array of diodes formed by diffusion through apertures in an insulating oxide layer. These diodes are initially provided with a reverse bias and in the areas of the target which are illuminated by the input image, photogenerated carriers will drift to the readout surface and locally discharge the diodes. When the readout side of the target is scanned with an electron beam, these discharged diodes accept current and return to their reverse bias state. The flow of the current through an external load resistor constitutes a video signal from which an image may be built up on a television monitor. A further extension of this light input concept target is the use of a target in which the light image is first focused onto a photocathode and the emitted photoelectrons from the photocathode are in turn accelerated by an electric field and focused onto the input of the target. The carriers generated by the photoelectrons have the same function as a photogenerated carrier described above. This second type of tube, however, is much more sensitive.

An additional refinement of the target structure is to form a thin n+ layer at the front surface or input surface of an n-type silicon diode target such as described by an article by D. K. Schroder et al. in the Journal of Applied Physics, Vol. 41, No. 12, 5,038–5,040, Nov. 19, 1970. The effect of this layer is to provide a built in field region which tends to aid the transport of minority carriers (holes) generated by incoming light or electrons toward the p-n junctions. As the recombination rate for these carriers is very high at the input surface, this feature provides targets which have high conversion efficiency of incoming photons or electrons to collected carriers.

To allow the scanning reading electron beam to land on the individual diode regions without being deflected by charge which tends to build up on the surrounding insulating layer, two main approaches have been used. The first is to cover the entire read side of the target with a resistive layer which allows the discharge to leak off of the insulating layer. The second approach is to shield most of the insulating layer from the electron beam with a conductive contact pad provided for each region which extends out from each region and is separated by a very small space.

One problem with these types of targets is the response to a very bright spot in the image scene. Normally carriers which are generated in the local area of the n-region or substrate of the wafer diffuse across to the nearest junction with very little lateral spread. Under intense illumination, the high concentration of generated carriers produces a considerable lateral diffusion field and adjacent diodes are discharged over an area much greater than that which was illuminated on the input surface. This phenomenon is referred to as blooming and tends to obscure the total scene being imaged under certain conditions. This problem and a solution thereto is discussed in copending application Ser. No. 157,898 entitled "Charge Storage Target and Method of Manufacture Having A Plurality Of Isolated Discrete Charge Storage Sites", by David Green and assigned to the same assignee and filed on June 29, 1971. The solution proposed in this copending application is the utilization of n+ guard rings around each diode to restrict lateral carrier diffusion. These structures are sometimes difficult to fabricate in that they require two photomask processes. In addition, because of certain critical ion implantation techniques, these structures do not result in complete separation of the diodes from each other.

SUMMARY OF THE INVENTION

This invention is directed to a charge storage device and method of manufacture of the type in which the storage target includes an electrical conductive support mesh with semiconductive storage sites provided within the interstices of the support mesh and insulated therefrom. In this manner, the semiconductive storage sites are completely isolated from the other storage sites in the target. The mesh with insulating coating provide a barrier to prevent any lateral spreading of charge carriers generated within the semiconductive member to any adjacent storage sites. The process includes providing a semiconductor wafer having a plurality of pillars extending from a substrate portion. Junction regions are provided in the pillars and form the storage sites. An insulating coating is provided over the sides of the pillars and the surrounding moat surfaces. An electrical material is electroplated into the moat regions between the pillars so as to fill up the moat regions and thereby form an electrical conductive support grid. The semiconductor wafer is then etched away leaving the pillars supported within the interstices of the conductive support mesh.

BRIEF DESCRIPTION OF THE DRAWINGS

For a better understanding of the invention, reference may be had to the preferred embodiments, exemplary of the invention, shown in the accompanying drawings, in which.

DESCRIPTION OF THE PREFERRED EMBODIMENTS

Figure 1:
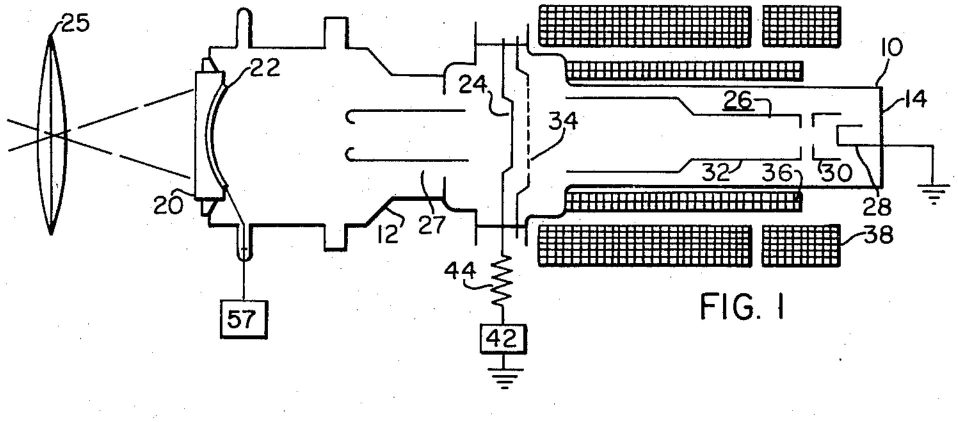
FIG. 1 is a schematic diagram of a pickup tube in accordance with the teachings of this invention.

In FIG. 1 there is illustrated a pickup tube comprised of an evacuated envelope 10 including a tubular body portion 12 having a button stem 14 provided at one end thereof for closing off that end of the tubular portion 12. The button stem 14 also includes a plurality of lead-ins (not shown) for applying potentials to the electrodes within the envelope 10. The other end of the tubular member 12 is closed off by a faceplate member 20. The faceplate 20 is of a suitable material transmissive to the input radiations from a scene to be viewed. A suitable material for the faceplate 20 is glass or quartz. The faceplate 20 may be of a fiber-optic type construction. A photocathode 22 is provided on the inner surface of the faceplate 20. The photocathode 22 may be of a suitable material responsive to the input radiations such as a multi-alkali photocathode material. The photocathode 22 will absorb radiations directed thereon from a scene and focused thereon by a suitable lens 25. A target member 24 is provided between the photocathode 22 and a reading electron beam gun 26. Photoelectrons emitted by the photocathode 22 are focused by suitable means such as electrode 27 onto the target 24. Suitable structures for imaging the photoelectrons onto the target are well known and are described in volumes 1 and 2 of Photoelectronic Imaging Devices, Plenum Press, New York, London, 1971.

The electron gun 26 is provided at the opposite end of the envelope 10 with respect to the photocathode 22 and generates a pencil-like electron beam for scanning a raster over the output side of the target 24. The electron gun 26 is comprised of at least a cathode 28 which may be at ground potential. A control grid 30 and a focusing electrode 32 may also be provided in the electron gun 26. A grid member 34 may be provided adjacent the target member 24 and may be at a potential of about 500 volts positive with respect to ground. The electron gun 26 may be focused by either electrostatic or electromagnetic means. An electromagnetic focusing coil 36 is provided about the outer portion of the tubular member 12. The deflection means may also be electrostatic or electromagnetic and in the specific device is shown as electromagnetic coil 38. The photocathode 22 may be connected to a high potential source of about 10,000 volts negative with respect to ground provided by a potential source 57. The target member 24 is provided with a suitable potential of about 10 volts positive with respect to ground by means of a potential source 42. A resistor 44 is also provided between the voltage source 42 and the target 24 for deriving the output signal from the device.

Figure 3:
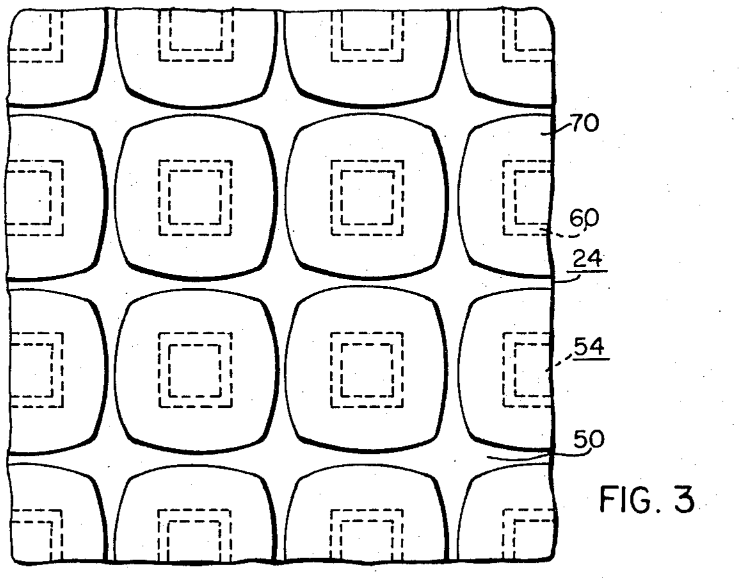
FIG. 3 is a top view of the target electrode in FIG. 1 with the pillars outlined.
Figure 2:
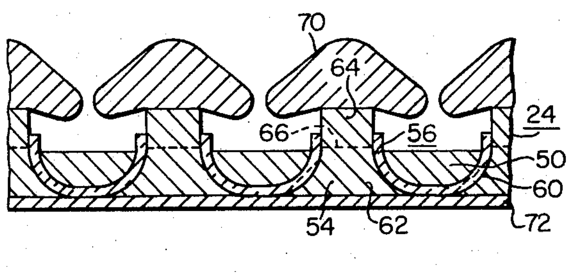
FIG. 2 is an enlarged sectional view of a fragment of the target electrode of FIG. 1.
Figure 4:
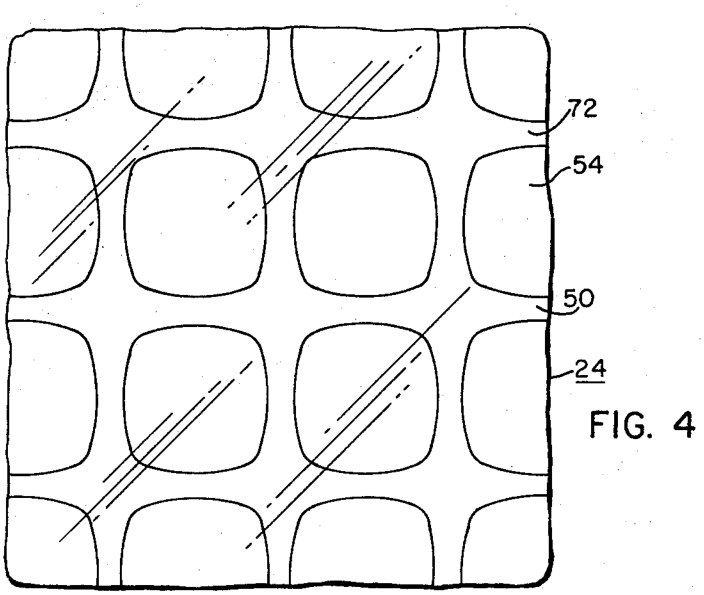
FIG. 4 is a bottom view of the target view illustrated in FIG. 1 as seen through layer 72.

The structure of the target 24 is illustrated in FIGS. 2, 3 and 4. The target 24 is comprised of an electrical conductive mesh 50, pillar members 54 provided in the interstices 56 of the mesh 50 and these pillars 54. The pillars 54 are of a semiconductive material such as silicon with a barrier layer 60 of insulating material such as silicon dioxide positioned between the pillar 54 and the mesh 50. The pillar 54 is comprised of an n-type silicon region 62 which is positioned within the interstices 56. A portion of the pillar 54 extends above the mesh 50 and the upper portion of the pillar 54 is provided with a p+ region 64 forming a junction 66 with the region 62. An electrical contact pad 70 is provided on the top of the pillar 54 which extends beyond the pillar 54 so as to cover not only the interstice 56 in the mesh 50 but also a substantial portion of the conductive mesh 50. An electrical conductive layer 72 is provided on the lower surface of the target 24 for making electrical contact to all of the silcon pillars 54 within the target structure. The layer 72 may be of a suitable electrical conductive material such as gold. The thickness of this layer 72 is about 50A so as to not substantially interfere with the incoming electron beam or light radiations directed onto the silicon region 62.

Figure 5:
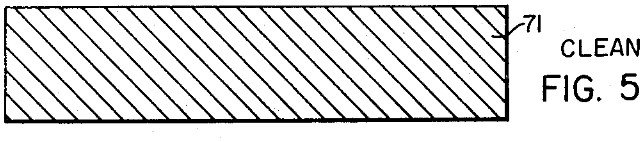
FIGS. 5 through 21 illustrate the process steps in the manufacture of the target electrode shown in FIG. 1.
Figure 6:
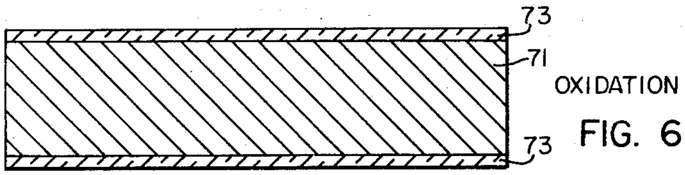
Figure 7:
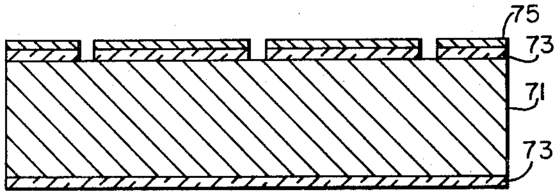
Figure 8:
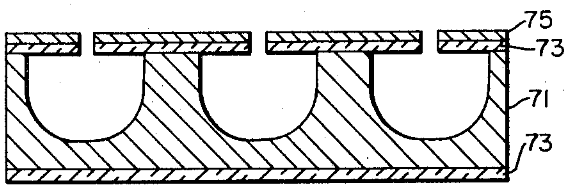
Figure 9:
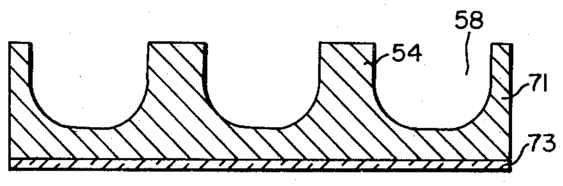

In the fabrication of the target set forth in FIGS. 2 through 4, a wafer 71 as shown in FIG. 5 of a suitable semiconductive material such as silicon and of an n-type having a resistivity of about 10 ohms centimeter and with a diameter of about 1.25 inch and a thickness of about 0.008 inch is provided. The orientation of the crystal may be of any suitable types such as a 100 wherein the etching action provides a deeper etch vertically and negligibly in the lateral direction. The first step in the fabrication is to provide an etch mask. This is formed by forming an insulating coating 73 such as an oxide coating on the upper and lower surfaces as illustrated in FIG. 6. The thickness of the coatings 73 is about 10,000 angstroms. The oxide coating 73 may be provided by a thermal oxidation at about 1,100°C for 3 hours in an atmosphere with oxygen. The next step in the process is to provide a resist coating 75 over the upper oxide layer 73. A suitable resist is a negative acting type photoresist. The photoresist layer 75 is exposed to suitable radiation through a mask by well known techniques so that the areas exposed to light become less soluble and the unexposed areas which are soluble can be removed by washing to form a mosaic pattern of islands of photoresist on the upper silicon oxide layer 73. A suitable etch is then utilized to etch away the exposed portion of the silicon oxide layer 73 and the resulting structure is shown in FIG. 7. This etch may be a buffered hydrofluoric acid type. The next step in the process is to deep etch the silicon wafer 71. The deep etch is accomplished by utilizing a suitable etching solution that will react with the silicon but not the silicon oxide. A suitable etch for this is a solution of about 25 parts of $Hn0_3$, 10 parts of acetic acid and 3 parts of hydrofluoric acid. This treatment lasts for about 90 seconds and forms the structure shown in FIG. 8. The resist layer 75 is then removed. A suitable etch is then utilized to etch away the oxide etch mask 73. Moat regions 58 are etched out to form the pillars 54. This may be accomplished with a buffered hydrofluoric acid and the resulting structure is shown in FIG. 9.

Figure 10:
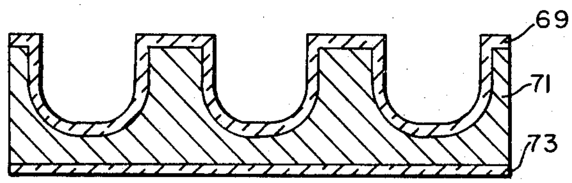
Figure 11:
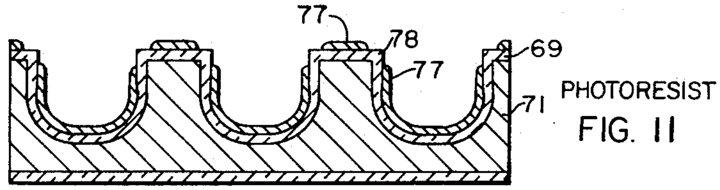
Figure 12:
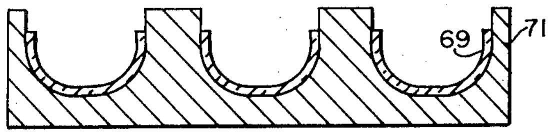

The next step is to provide an insulating coating 69 over the pillared surface. A suitable oxide is previously discussed with respect to 73 is provided over the upper surface of the wafer as illustrated in FIG. 10. The next step in the operation is to provide a resist coating 77 as illustrated in FIG. 11 on the coating 69. This may be accomplished by utilizing a suitable resist such as a positive photoresist such as AZ11 supplied by Shipley Co., Newton, Mass. and this is spun over the mesa side of the target, prebaked and developed but not exposed to light in order to provide an etch resistant coating 77. The speed of rotation is about 3,500 rpm and for a period of about one-half minute. The viscosity is about 36 centipoise. Due to the sharp edges of the pillars 54 the resist will not cover the edge or region 78 which outlines accurately the top of the insulated coated pillar 54. The corner formed between the top surface and side of the insulated pillar 54 has a radius of curvature of about 1,000 angstroms. The radius of curvature should not be greater than 1 micron. This sharp edge prevents resist adhesion. The next step in the operation is to etch the upper surface of the wafer with a suitable etchant such as buffered hydrochloric acid for a period of about 10 minutes. This etching operation attacks the silicon dioxide coating 69 in the exposed region 78 and proceeds to further attack the coating 69 beneath the resist coating 77 so that both the coatings break down. This undercutting progresses at the same rate on the horizontal top as on the vertical sides of the pillars 54. The layers of oxide 69 and resist 77 will be removed from the top of the pillar before the sides of the pillar 54 are completely stripped leaving an oxide coating 69 on sides of the pillars 54 as illustrated in FIG. 12. The next step in the process is to diffuse a suitable p-type material such as boron into the top of the pillar 54 to form the region 64.

Figure 13:
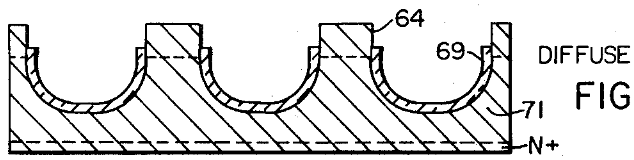

The wafer may then be thinned by etching away the lower or input side of the wafer 71 so as to provide a thickness between the recessed surface of the moat 58 and the input surface of about 10 microns. A suitable etch is a solution of about 25 parts of $HnO_3$, 10 parts of acetic acid and 6 parts of hydrofluoric acid. The next step is to diffuse an n+ layer into the input side of the target by providing $PCl_3$ ambient for about 45 minutes at 900°C which results in phosphorous diffusion with the surface. This provides a gettering action. An etch of about 60 seconds of buffered HF may be required to remove a thin oxide from the pillar surface. The next operation is to hydrogen anneal the wafer at 400°C for about 60 minutes. The resulting structure is illustrated in FIG. 13.

Figure 14:
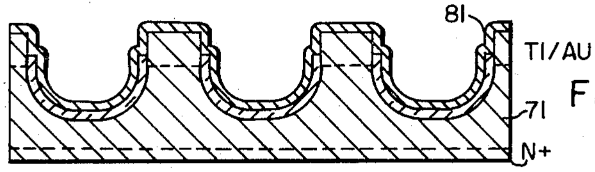
Figure 15:
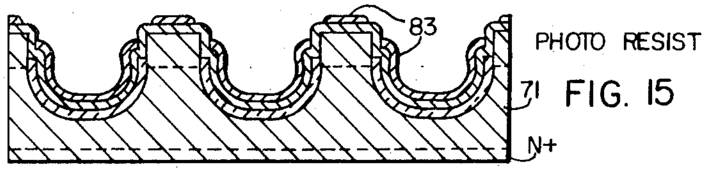

The next step in the operation is to evaporate a thin pilot coating 81 of about 100A of Ti and then 300A of Au onto the upper surface of the wafer as illustrated in FIG. 14. The coating 81 is deposited over the entire upper surface on the output side of the target 24. After this operation, the target again is provided with a suitable resist coating 83 as described with respect to FIG. 11 and spun onto the surface to provide the structure illustrated in FIG. 15. The spin coating process is more fully described in copending application Ser. No. 296,718, filed Oct. 11, 1972 and assigned to the same assignee.

Figure 16:
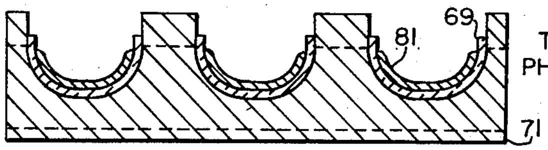

A suitable etch is used to remove the coating 81 from the top surface of the pillar 54 and a portion of the side surfaces as illustrated in FIG. 16. A suitable etching solution for this process is aqua regia for gold removal followed by dilute (1 part HF to 50 parts $H_2O$) hydrofluoric acid for titanium removal.

Figure 17:
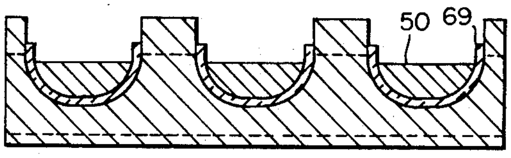

The remaining resist coating 83 is removed in a suitable solvent such as acetone and leaves the remaining coating 81 on the surfaces of the moat as shown in FIG. 16. This plating operation forms the grid membrane 50 as illustrated in FIG. 17. The thickness of the central portion of the plated mesh may be about 3 microns. The plating operation is accomplished by immersing the target in a gold plating solution, of which the commercially available Pur-A-Gold by Sel-Rex Co. is an example. An electrical connection is made to the pilot layer 81 and held at a negative potential. An electrode of opposite or positive polarity is positioned approximately 2 inches away from and parallel to the pillared surface of the target. This positively biased electrode is conveniently composed of platinum. To stabilize the current flow, it is useful to insert a resistor of typically 100 ohms in series with the target. The plating bath is maintained at 55°C and is vigorously stirred. The negative potential to the pilot layer 81 is increased until a current density of about 1.2 mA 1 square inch is reached and then held at this current density. It is an advantage of this process that this plating current density is non-critical. A plated thickness of about 3 microns in the center of the recessed area is accomplished in about 45 minutes, forming a metallic mesh or grid in the moat. The resulting structure is shown in FIG. 17.

Figure 18:
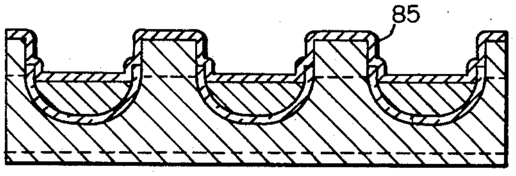
Figure 19:
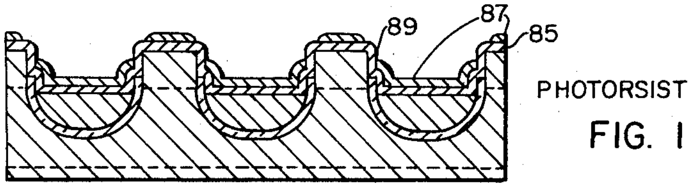
Figure 20:
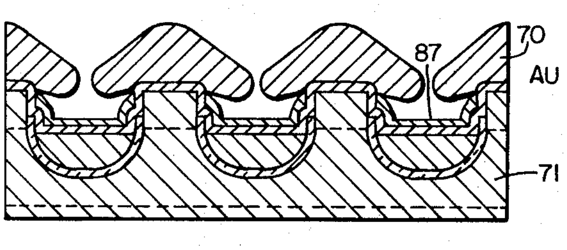
Figure 21:
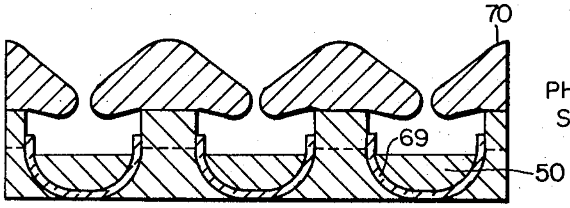

The next operation is to provide electrical contacts 70. The first step is to again evaporate a pilot electroplating layer 85 similar to that already described and as seen in FIG. 18. The next step is to spin a resist coating 87 onto the coating 85 as illustrated in FIG. 19. Again this is accomplished by providing a suitable resist similar to that previously described with respect to FIG. 15 to provide the exposed portions 89. The next step is to electroplate the conductive contacts 70 onto the tops of the pillars 54 to form the structure illustrated in FIG. 20. Note that the plated bumps do not touch the plated mesh, thus avoiding diode shorts. This is done utilizing the plating procedure aforementioned. The next step is to remove the photoresist coating 87 from the upper surface of the wafer by washing in acetone. The next step is to again thin the target 24 by means aforementioned. This thinning operation however proceeds until the substrate 71 is completely removed, that is to say the silicon dioxide coating 69 in the recessed or moat area is exposed and the base of the pillars 54 becomes the input side of the target 24, and leaves only the pillars of silicon 54 with their coating 69 embedded in the plated mesh 50 as illustrated in FIG. 21. The removal of the silicon membrane or substrate requires a close control to achieve uniform silicon removal and to avoid localized over-etching.

Another possible approach is to provide a wafer with an epitaxially grown layer of n type on an n+ substrate, where the n+ material is removed during the etch and the n layer of epitaxial silicon provides the pillars. This enhances the uniformity of silicon removal because the n+ layer will etch more rapidly than the n layer in inverse proportion to the resistivity of the layers. In some cases it may be desirable to use an electrical bias in the etch operations. After this step, the diodes are all completely isolated. To enable signal extraction a thin transparent conductive layer 72 is deposited on the input side. Such a coating 72 can be composed on 50A of gold.

In the operation of the device in FIG. 1, radiation from a scene is directed through the lens 25 onto the photocathode 22. This radiation is absorbed by the photoemissive cathode 22 and the photoelectrons are generated and accelerated into the target 24. The electron beam from the electron gun 26 initially establishes and periodically reestablishes a reverse bias on the p-n junction formed within the target 24 between the contact 70 and the coating 72. The electrons enter through the layer 72 into the n-type pillar and produce corresponding patterns of electron hole pairs in response to electron bombardment. The holes diffuse to the junction of the diode formed and partially discharge the reverse biased diodes. The electron beam from the electron gun 26 will recharge on the next scan and will produce an output pulse to the video output which is obtained across the resistor 44. The operation is such that the electron gun 26 charges the contact 70 to cathode potential while the backplate formed by the layer 72 is at a positive potential of about 10 volts. The p-n junction 66 existing between the contact 70 and the layer 72 is reverse biased and when photoelectron bombardment of the wafer is brought about, the conductive pad 70 will charge in a positive direction. The positive carriers generated in the n-type substrate of the pillar associated with one diode under illumination will diffuse to the diode junction in a normal manner. In the event of high illumination the minority carriers will diffuse only to the junction in that there is no way for them to pass to an adjacent diode because the interconnecting semiconductor is absent and holes cannot diffuse through insulating and metallic barriers.

It is of course obvious that other modifications will readily occur to those skilled in the art.

I claim as my invention:

1. A charge storage target electrode sensitive to input radiations comprising:

an electrically conductive base layer;

a plurality of spatially distributed semiconductive storage pillar-like members extending from the conductive base layer;

a p-n junction within each of said pillar-like members;

an insulating layer provided on the conductive base layer between the spatially distributed pillar-like members, which insulating layer extends up the sides of the pillar-like members a predetermined distance to electrically isolate individual pillar-like members;

an electrically conductive layer atop the insulating layer between the spatially distributed pillar-like members;

an electrically conductive contact pad provided atop each pillar-like member which contact pad extends transversely beyond the sides of pillar-like members and spaced from adjacent contact pads.

2. The charge storage target electrode specified in claim 1, wherein said electrically conductive base layer is transmissive to input radiations in the form of light or electrons and serves as the input side of said electrode.

3. The charge storage target electrode specified in claim 1, wherein said p-n junction is reverse biased during operation.

4. The charge storage target electrode specified in claim 1, wherein said pillar-like members have a cross-sectional area at the base portion upon the conductive base layer greater than the top portion contacting the contact pad.

* * * * *